(12) United States Patent
Hansen

(10) Patent No.: US 6,530,238 B2
(45) Date of Patent: Mar. 11, 2003

(54) COOLING UNIT

(75) Inventor: Helge Reimer Hansen, Åbenrå (DK)

(73) Assignee: Maersk Container Industri A/S, Tinglev (DK)

( * ) Notice: Subject to any disclaimer, the term of this patent is extended or adjusted under 35 U.S.C. 154(b) by 0 days.

(21) Appl. No.: 10/145,608

(22) Filed: May 3, 2002

(65) Prior Publication Data

US 2003/0000237 A1 Jan. 2, 2003

Related U.S. Application Data

(63) Continuation of application No. PCT/EP00/10994, filed on Nov. 8, 2000.

(30) Foreign Application Priority Data

Nov. 9, 1999 (EP) .............................................. 99122324

(51) Int. Cl.$^7$ .............................. F25B 1/00; F25B 49/00
(52) U.S. Cl. ...................................... 62/228.4; 62/230
(58) Field of Search ............................... 62/228.4, 230, 62/228.5, 228.1

(56) References Cited

U.S. PATENT DOCUMENTS

| | | | |
|---|---|---|---|
| 4,325,224 A | * | 4/1982 | Howland .................. 62/196 A |
| 4,787,211 A | | 11/1988 | Shaw |
| 5,050,389 A | | 9/1991 | Wigmore et al. |
| 5,099,654 A | | 3/1992 | Baruschke et al. |
| 6,119,473 A | * | 9/2000 | Kishita et al. .............. 62/228.4 |
| 6,393,852 B2 | * | 5/2002 | Pham et al. ................ 62/228.5 |

FOREIGN PATENT DOCUMENTS

| | | |
|---|---|---|
| DE | 37 06 152 | 9/1988 |
| EP | 0 431 491 | 6/1991 |
| EP | 0 718 568 | 6/1996 |

OTHER PUBLICATIONS

Caisso B. et al., "Fonctionnement, Interet et Criteres de Section," Revue Pratique Du Froid et du Conditionnement D'Air, Fr, PYC Edition S.A. Paris, Oct. 1, 1996, pp. 46–47, 49.

* cited by examiner

*Primary Examiner*—Denise L. Esquivel
*Assistant Examiner*—Marc Norman
(74) *Attorney, Agent, or Firm*—Barry R. Lipsitz

(57) ABSTRACT

To provide a transportable cooling unit for maintaining a transport volume at a defined temperature, comprising a closed cooling circuit and a controller sensing a temperature present within said transport volume and controlling said cooling circuit so as to provide the cooling power demanded at said evaporator for maintaining said defined temperature and minimizing energy consumption, said controller operates said closed cooling circuit between a minimum possible cooling power and a maximum possible cooling power in a sequence of different operational stages, said controller further operates said closed cooling circuit in each one of at least two upper operational stages at a compressor speed related cooling capacity different said other upper operational stages and within said respective upper operational stages said controller operates a compressor in an uninterrupted mode and adjusts said cooling power stepless speed control of said compressor.

23 Claims, 5 Drawing Sheets

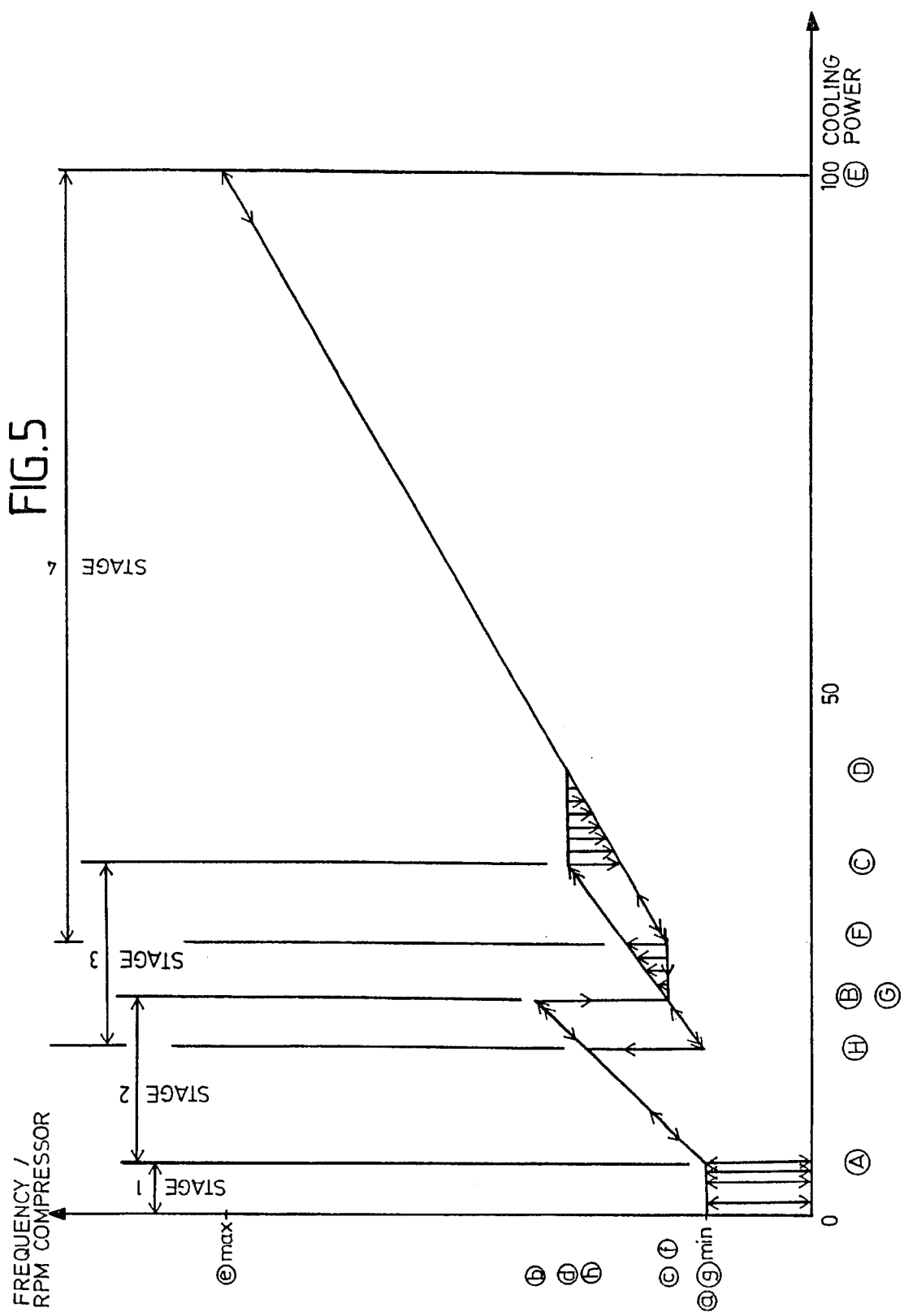

COOLING UNIT

The present disclosure relates to the subject matter disclosed in international application No. PCT/EP00/10994 of Nov. 8, 2000, which is incorporated herein by reference in its entirety and for all purposes.

BACKGROUND OF THE INVENTION

The invention relates to a transportable cooling unit for maintaining a transport volume at the defined temperature, comprising a closed cooling circuit serially including a multi-stage compressor, a condenser, an expansion device and an evaporator arranged in said transport volume as well as a speed-controlled electric motor driving said compressor.

Such transportable cooling units are, for example, disclosed in the article of R. D. Heap "Refrigerated containers in . . . ".

The object of the present invention is to provide a transportable unit cooling which provides minimized energy consumption in combination with optimized temperature stability within the transport volume irrespective of the environment.

SUMMARY OF THE INVENTION

This object is achieved by a transportable cooling unit for maintaining a transport volume at a defined temperature, comprising a closed cooling circuit serially including a multi-stage compressor, a condenser, an expansion device and an evaporator arranged in said transport volume, a speed-controlled electric motor driving said compressor and a controller sensing a temperature present within said transport volume and controlling said electric motor so as to provide the cooling power demanded at said evaporator for maintaining said defined temperature and minimize energy consumption, said controller operating said closed cooling circuit between a minimum possible cooling power and a maximum possible cooling power in a sequence of different operational stages comprising a lowest operational stage (stage 1) and a sequence of at least two upper operational stages (stage 2 to 4), said controller operating said closed cooling circuit in each one of said upper operational stages (stage 2 to 4) at a compressor speed related cooling capacity different from said compressor speed related cooling capacity in said other upper operational stages and within said respective upper operational stages in an uninterrupted mode and adjusting said cooling power provided by said closed cooling circuit by an essentially stepless speed control of said electric motor.

The advantage of the present invention is to be seen in the fact that due to the sequence of different operational stages the compressor can be run within a reasonable speed range which is advantageous for an optimized compressor design and optimized compressor energy consumption but within the speed range different levels of cooling power can be achieved by using different operational stages of the closed cooling circuit, which makes it possible to minimize energy consumption of the entire system.

According to the present invention control of the speed of the electric motor could be achieved by various means. It turned out to be advantageous for the speed controllable electric motor to be a frequency controlled AC-motor, because in such a frequency controlled AC-motor the energy consumption can be reduced in accordance with the speed of the controllable electric motor.

In accordance with the aforementioned definitions of the present invention it is not defined how the controller operates the compressor in said low operational stage. It is particularly advantageous if in said lowest operational stage said controller operates said compressor in an interrupted mode at low speed and adjusts said necessary cooling capacity by adjusting at least one of the parameters comprising interruption interval and speed.

The advantage of this embodiment of the present invention is that in the low operational stage it is allowed to switch the compressor on and off so as to be able to control low cooling power of the closed cooling circuit and to maintain the energy consumption dependent on the demanded cooling capacity but to maintain a certain level of speed if the compressor is operable for maintaining a reasonable level of compressor efficiency.

It is particularly advantageous if the controller in said low operational stage maintains said speed of said compressor essentially constant and varies the interruption interval, e.g. the intervals within which the compressor is switched on or off so that the cooling power is only controlled by controlling the interruption intervals.

In such an embodiment it is of particular advantage if in said lowest operational mode said speed of said compressor is in the dimension of the minimum possible speed for the compressor. This means that the compressor is run at the lowest allowable speed for proper operation and that if only cooling power is needed which is lower than the cooling power provided at that minimum speed a further reduction is performed by interrupting the compressor.

In connection with the aforementioned explanations of various embodiments of the present invention it has not been defined how the controller determines the cooling power demanded.

One manner of determining the cooling power demanded would be to only detect the temperature present within said transport volume and to reduce the speed of the compressor to the lowest possible level.

A more advantageous manner of determining the cooling power demanded is to compare the temperature present within that transport volume and the temperature of ambient air.

With respect to the temperature detection within the transport volume the location of detection has not been defined in connection with the explanation of the aforementioned embodiments.

Generally, the temperature within the transport volume can be detected anywhere therein.

For obtaining a fast response of the temperature detection it is advantageous if the controller senses the temperature in a stream of air circulating within said transport volume because in such a case the controller obtains the proper temperature values with a short response time.

In addition, it is advantageous to sense the temperature within said transport volume close to said evaporator because in this case the cooling power demanded can be determined more precise.

In general, the controller could start in the uppermost operational stage or in the lowermost operational stage and follow the sequence of operational stages until the desired temperature is obtained.

To be able to respond precisely to temperature changes it is of advantage if the controller selects the currently necessary operational stage in accordance with the cooling power demanded.

In accordance with the present invention, as discussed above, it would be possible to have a varying compressor speed related cooling capacity of said closed cooling circuit within at least one of said upper operational stages, however, for designing an easily controllable system it is of advantage if said compressor speed related cooling capacity of said closed cooling circuit is constant within each of said upper operational stages.

With respect to the lowest operational stage the compressor speed related cooling capacity could vary too. However, it is also of advantage if said compressor speed related cooling capacity of said closed cooling circuit is constant within said lowest operational stage.

With respect to a cost effective design of the inventive cooling unit it turned out to be advantageous for said compressor speed related cooling capacity of said closed cooling circuit to be the same as the compressor speed related cooling capacity in said one of said upper operational stages covering the lowest range of cooling power of said sequence of upper operational stages.

If the controller has the possibility to switch from one upper operational stage to another operational stage such a switching is advantageously defined by a respective cooling power. To avoid at this respective cooling power a fast witching back and forth between one upper operational stage and the other operational stage it is advantageous if the controller switches from one upper operational stage to another upper operational stage with a hysteresis with respect to the level of cooling power, which means that the cooling power at which the controller switches from one upper operational stage to the next higher operational stage is higher than the cooling power at which the controller switches from the higher operational stage to the next lower operational stage.

In the course of such a switching from one operational stage to the next operational stage the cooling power provided by the closed cooling circuit could come out of control.

This is avoided if in the course of a transition from one of said upper operational stages to another of said upper operational stages said controller maintains full control of the cooling power provided by said closed cooling circuit by adjusting the speed of said compressor in accordance with a change of the compressor speed related cooling capacity.

This means that even in the course of a transition from one operational stage to the next operational stage, which has the consequence that the corresponding compressor speed related cooling capacity changes, precise control of the cooling power provided is still maintained due to the fact that the controller even in the course of such a transition is still able to adjust the cooling power by adjusting the speed of the compressor.

An advantageous embodiment of the present invention provides a compressor designed as a multi-stage compressor which is operable in a first mode using a reduced number of stages and in a second mode using all stages of said compressor for compressing refrigerant. Such a design has the advantage that when operating the compressor at a reduced number of stages the compressor speed related cooling capacity can be reduced and in addition the energy consumption is reduced due to the lower amount of energy which is needed for operating such a multi-stage compressor in a reduced number of stages.

It is of particular advantage if such a multi-stage compressor is controllable by said controller of said closed cooling circuit so as to operate in said first mode or said second mode.

It is of particular advantage according to the present invention if in one of said upper operational stages said compressor operates in said first mode and in another of said upper operational stages said compressor operates in said second mode because then different operational stages can be defined by operating the compressor in different modes, e.g. a first and a second mode, and the controller can be used to switch the compressor between said first mode and said second mode.

In an embodiment of particular advantage it is provided that said controller changes from a stage in which the compressor operates in said first mode to the stage in which the compressor operates in said second mode at a defined level of cooling power which is higher then the defined level of cooling power at which the controller switches from the operational stage in which the compressor operates in said second mode to the operational stage in which the compressor operates in said first mode. Such a hysteresis used for changing between two operational stages is advantageous insofar as it prevents the controller at a certain level of cooling power from switching back and forth between the operational stages and therefore providing an unstable controlling characteristic which in particular has the consequence that the tolerances with respect to the defined temperature within the transport volume increase.

In another advantageous embodiment according to the present invention an economizer is provided in said closed cooling circuit.

Such a economizer could be designed to be fully operable within the entire operational range of the cooling unit.

However, it is of particular advantage if said economizer can be switched by said controller between an economizer off-mode and an economizer on-mode.

For providing different compressor speed related cooling capacities it is of particular advantage if in one of said upper operational stages the closed cooling circuit is controlled to operate in an economizer off-mode and in another of said upper operational stages said closed cooling circuit is controlled to operate in an economizer on-mode. Such an embodiment of the present invention has the advantage that within the same range of speed of the compressor, different compressor speed related cooling capacities can be obtained and these different compressor speed related cooling capacities also result in a different energy consumption by the compressor, because in the economizer on-mode the energy consumption of the compressor is increased with respect to the economizer off-mode.

To avoid an unstable behaviour of the cooling unit and, therefore, to avoid increased temperature tolerances due to unstable conditions an advantageous embodiment provides that said controller switches from the operational stage in which the closed cooling circuit is in the economizer off-mode to the operational stage in which the closed cooling circuit is in the economizer on-mode at a defined level of cooling power which is higher than the defined level of cooling power at which the controller switches from the operational stage in which the closed cooling circuit is in the economizer on-mode to the operational stage in which the closed cooling circuit is in the economizer off-mode.

The aforementioned object is further achieved by a refrigerated container comprising a thermally insulated housing enclosing a transport volume to be cooled, a cooling unit for cooling air circulating in said transport cooling volume, wherein said cooling unit is designed according to the features of the various embodiments as explained before.

Further advantages of the present invention are the subject matter of the detailed description of one embodiment of the present invention.

BRIEF DESCRIPTION OF THE DRAWINGS

FIG. 5 shows a schematic representation of the relationship between cooling capacity and speed of the compressor in various stages of operation.

DETAILED DESCRIPTION OF THE INVENTION

Figure 1:
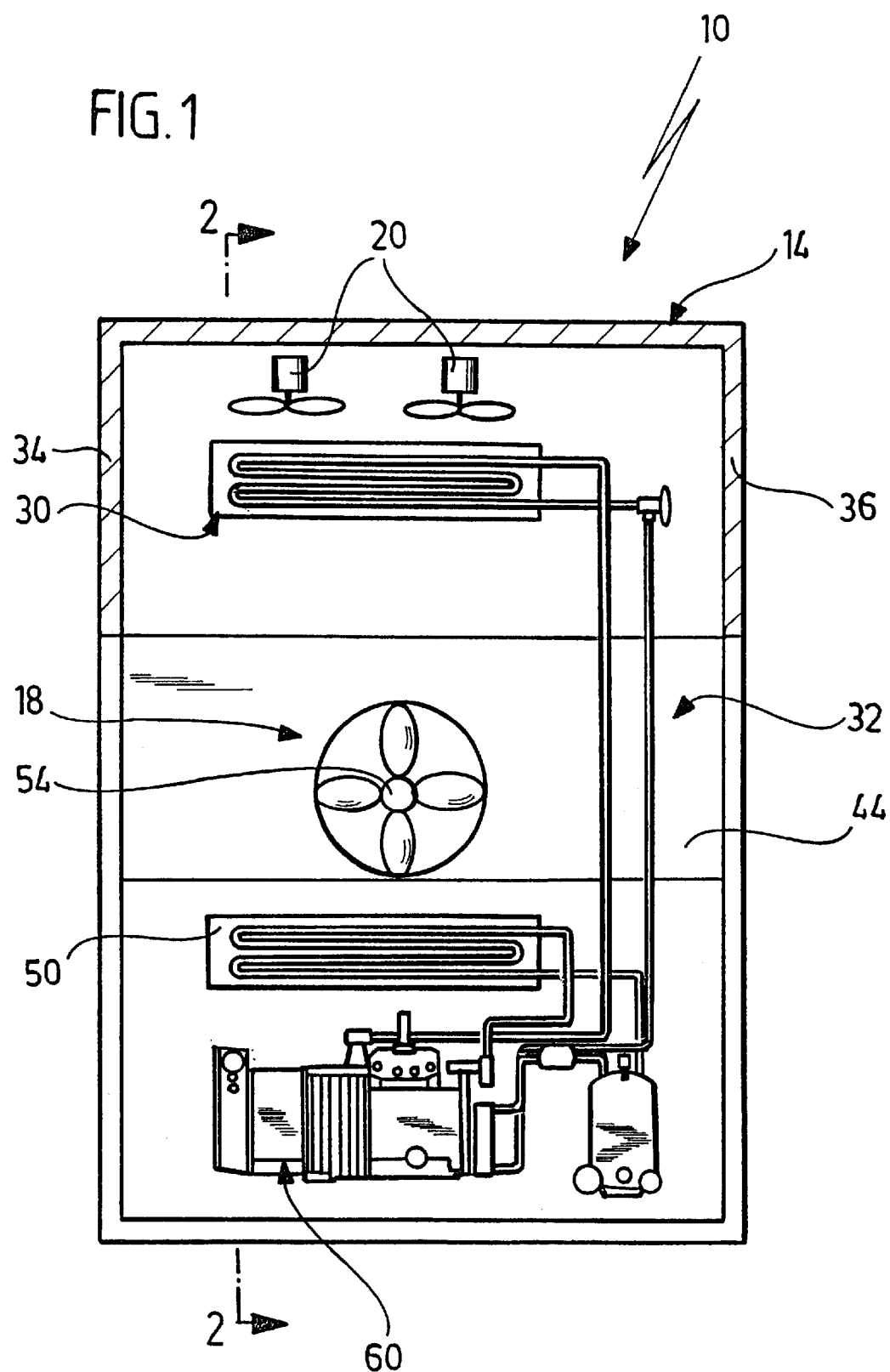
FIG. 1 shows a sectional view along lines 1—1 in FIG. 2 of a container provided with one embodiment of the present invention.
Figure 2:
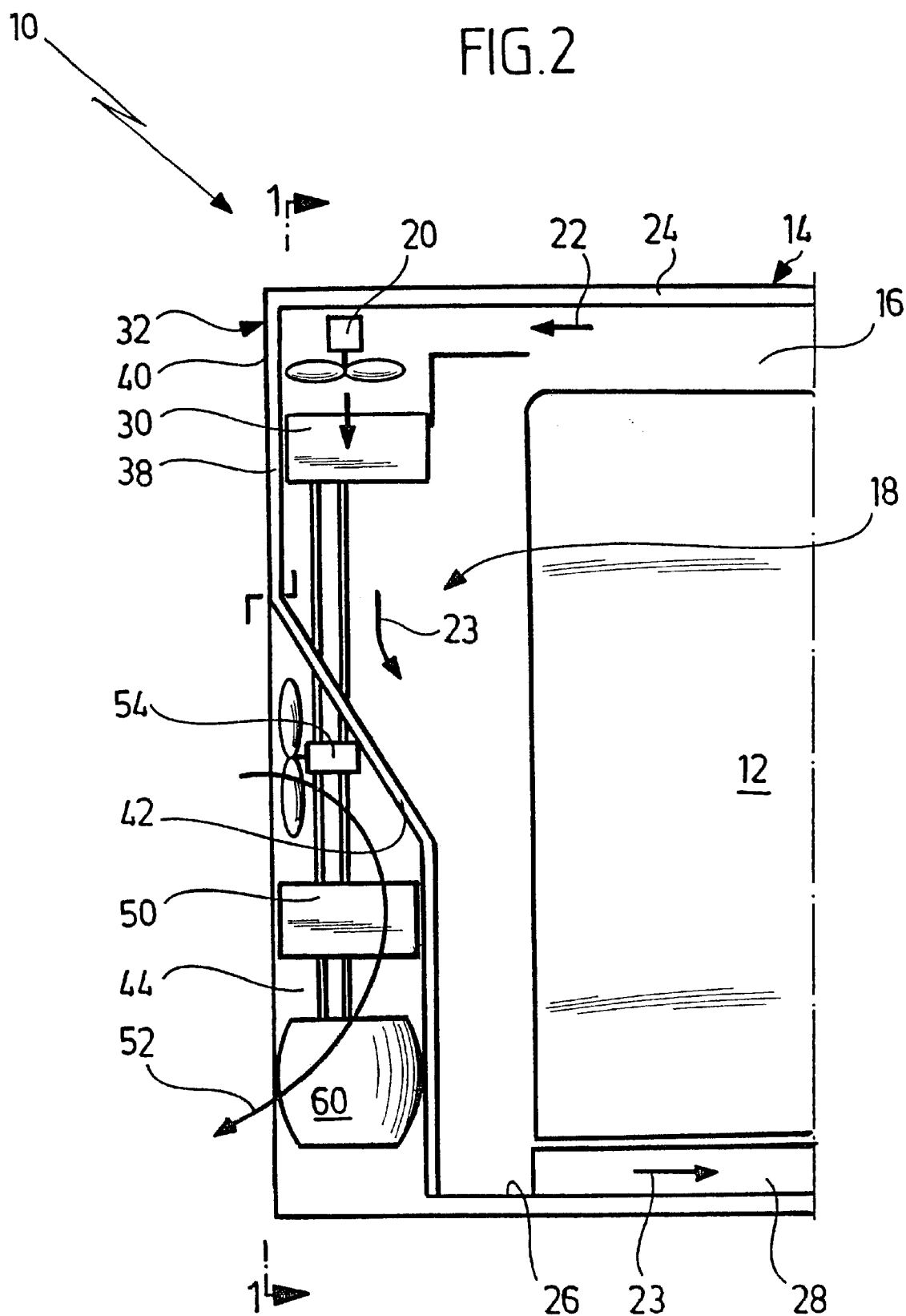
FIG. 2 shows a sectional view along lines 2—2 in FIG. 1.

A refrigerated container 10 designed for the transport of perishable cargos 12, such as, for example, frozen fish, chilled meat, fruit or chocolate or flower bulbs comprises a thermally insulated container housing 14 enclosing a transport volume 16 which is cooled by cooling unit 18.

Within the insulated housing air is circulated by an evaporator fan 20 receiving a return air stream 22 extending along a cover 24 of housing 14 and blowing this return air stream 22 through an evaporator 30 so that the stream of air is cooled and thereafter blown towards a bottom 26 of housing 14 as a supply air stream 23 and extending along bottom 26 between T-bars 28 of a T-bar floor of housing 14.

Preferably, evaporator fan 20 and evaporator 30 are arranged at a front portion 32 of housing 14.

Preferably, the evaporator 30 extends over a major portion of the width of front portion 32 between side walls 34 and 36 of housing 14.

Preferably, a front wall 38 of front portion 32 extends downwardly from cover 24 along a front end 40 of housing 14 and below evaporator 30 a portion 42 of front wall 38 steps back from front end 40 to form a space 44 between front end 40 and portion 42 of front wall 38 which is separated from transport volume 16 by portion 42 and in which a condenser 50 and a compressor 60 are arranged. Space 44 can be penetrated by a stream 52 of ambient air extending through condenser 50 and around compressor 60 for cooling of condenser 50 and compressor 60, said stream 52 of ambient air being blown through space 44 by a condenser fan 54.

Figure 3:
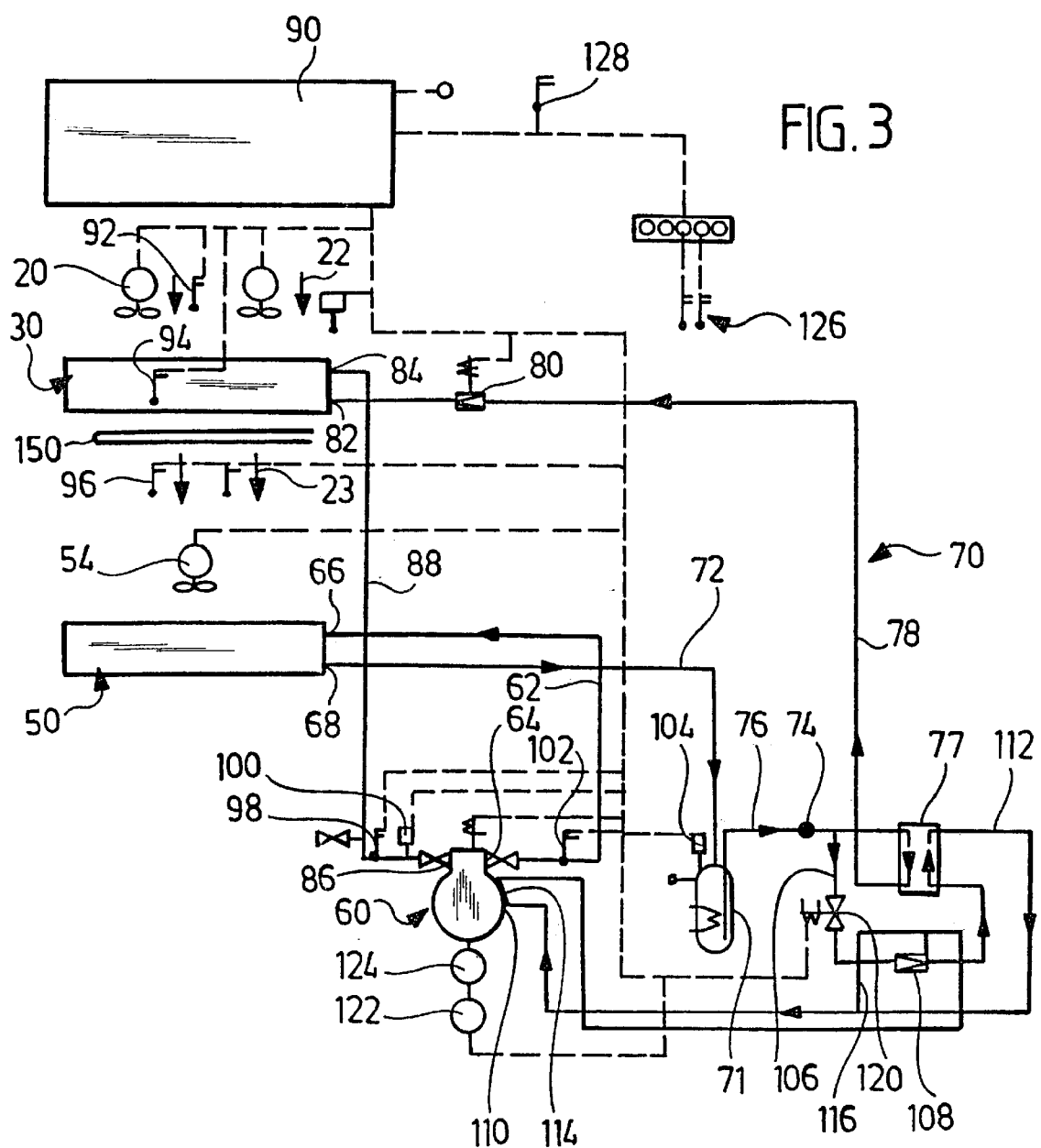
FIG. 3 shows a scheme of the various components of the cooling unit according to the present invention.

Evaporator 30, condenser 50 and compressor 60 are part of a closed cooling circuit 70 shown in detail in FIG. 3.

As can be seen in FIG. 3 compressor 60 receiving evaporated refrigerant compresses this refrigerant and discharges it into discharge pipe 62 extending between compressor discharge port 64 and an inlet port 66 of condenser 50.

The refrigerant after having passed through condenser 50 leaves through an outlet port 68 and is fed to a water cooled condenser 71 by pipe 72. After having passed through a water cooled condenser 71 condensed refrigerant passes a drying filter 74 arranged in pipe 76 guiding condensed refrigerant to economizer 77. After having passed through economizer 77 condensed refrigerant is passed via feed pipe 78 to electronic thermo valve 80 which is the expansion device and from electronic thermo valve 80 to an inlet port 82 of evaporator 30 and after being evaporated within evaporator 30 to outlet port 84 which is connected to a compressor inlet 86 by suction pipe 88.

Closed cooling circuit 70 is controlled by a controller 90 which is connected to a temperature sensor 92 detecting the temperature of return air stream 22 before entering into evaporator 30. Controller 90 is further connected to temperature sensor 94 detecting the temperature within evaporator 30 and further connected to temperature sensors 96 provided for detecting the temperature of supply air stream 23 coming from evaporator 30 and being guided back into transport volume 16 for cooling cargo 12.

Controller 90 is further connected to temperature sensor 98 provided in suction line 88 for detecting a suction temperature of compressor 60. In addition, suction line 88 is further provided with a low pressure transducer 100.

In addition, discharge pipe 62 is provided with temperature sensor 102 which is also connected to controller 90.

Controller 90 further controls the pressure within water cooled condenser 71 by pressure transducer 104.

Economizer 77 is cooled by condensed refrigerant branched off from pipe 76 by pipe 106 and fed to thermo valve 108 controlling the amount of refrigerant flowing to economizer 77. After having passed economizer 77 the amount of refrigerant is guided to an intermediate pressure inlet 110 of compressor 60 by pipe 112.

Thermo valve 108 is controlled by the temperature of compressor 60 detected by temperature sensor 114 and the pressure within pipe 112 detected via capillary tube 1 16 extending from pipe 112 to thermo valve 108.

Economizer 77 can be switched on or off by solenoid valve 120 arranged within tube 106 and being controlled by controller 90.

Controller 90 further controls frequency controller 122 which controls the speed of a motor 124 driving compressor 60.

Controller 90 is further connected to cargo temperature sensors 126 for detecting the temperature of the cargo and to ambient temperature sensor 128 for detecting the temperature of the ambient air used for a cooling condenser 50.

Controller 90 further controls evaporator fans 20 and condenser fan 54.

Figure 4:
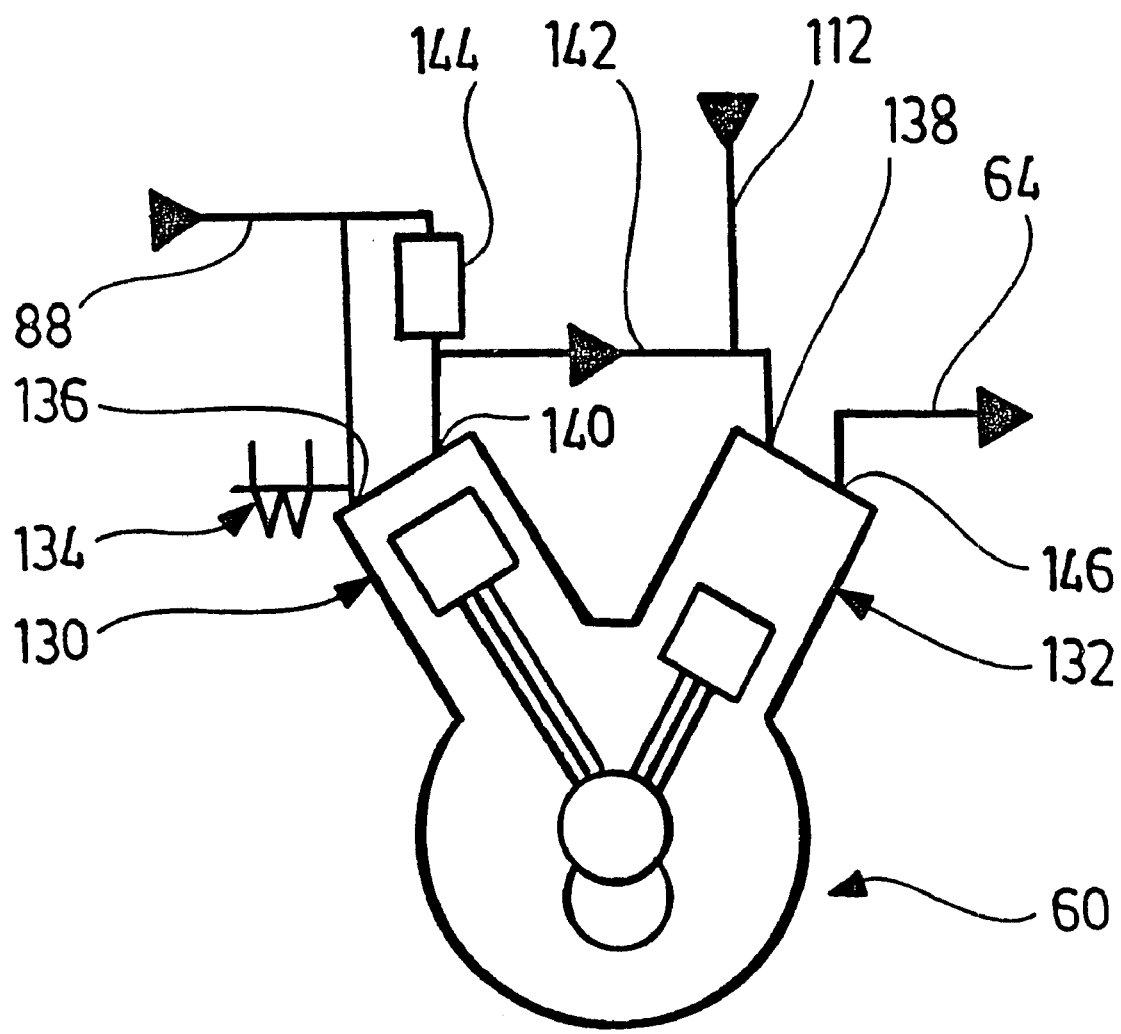
FIG. 4 shows details of the compressor on an enlarged scale.

As shown in FIG. 4 compressor 60 is a two stage compressor having, for example, two cylinders forming a first, low pressure stage 130 and two cylinders forming a second high pressure stage 132.

First stage 130 can be switched off by a solenoid valve 134 being able to close a low pressure inlet 136 of first stage 130 which is connected to compressor inlet 86.

An intermediate pressure inlet 138 of second stage 132 and an intermediate pressure outlet 140 of first stage 130 are internally connected by an internal duct 142 arranged within compressor 60 and this internal duct 142 is connected to suction pipe 88 via check valve 144 for enabling a connection of suction line 88 and intermediate pressure inlet 138 of second stage 132.

As long as solenoid valve 134 keeps low pressure inlet 136 open, first stage 130 generates an intermediate pressure within intermediate pressure duct 142 which is above the pressure at low pressure inlet 136 and consequently the pressure within suction line 88. In this case, check valve 144 closes so that all refrigerant from suction pipe 88 enters low pressure inlet 136 of first stage 130.

If, however, solenoid valve 134 closes low pressure inlet 136 the pressure within intermediate pressure duct 142 will decrease and check valve 144 will open to allow refrigerant from suction pipe 88 to directly enter into intermediate pressure duct 142 so as to be guided to intermediate pressure inlet 138 of second stage 132 which in any case compresses refrigerant and discharges compressed refrigerant through high pressure outlet 146 which is connected to compressor discharge 64.

Therefore, compressor 60 can be operated in a first mode, in which solenoid valve 134 is closed and only second stage 132 is operative or in a second mode in which both stages 130 and 132 are operative.

To defrost evaporator 30, controller 90 is adapted to control heating elements 150 within time intervals which can be determined. Heating elements 150 after being switched on can be switched off when a preset temperature at temperature sensor 94 is detected, because then it can be assumed that evaporator 30 is completely defrosted.

In addition, water cooled condenser can be activated or deactivated by controller 90. When water cooled condenser 71 is not activated air cooled condenser 50 is cooled by condenser fan 54 which can be operated at various speeds. The actual speed of condenser fan 54 is controlled in accordance with the actual pressure detected by high pressure transducer 104.

If water cooled condenser 71 is activated by controller 90 condenser fan 54 is switched off.

In addition, discharge temperature sensor 102 is used to detect the discharge temperature of the refrigerant discharge by compressor 60 and controller 90 will reduce the speed of compressor 60 in case the temperature of the discharge refrigerant exceeds a certain level.

The cooling unit according to the present invention is operated as follows:

Closed cooling unit 70 can be operated in various stages according to the cooling power demanded at evaporator 30 for maintaining a defined temperature within transport volume 16.

If a cooling power between 0 and a level A is demanded at evaporator 30, closed cooling circuit 70 will be operated in operational stage 1.

In stage 1 compressor 60 is operated in the first mode, e.g. with first stage 130 switched off. Further in stage 1 economizer 77 is inoperable so that closed cooling circuit 70 provides the lowest possible compressor speed related cooling capacity which can be defined to be a first compressor speed related cooling capacity.

Further in stage 1 compressor 60 is running at a minimum speed level which is indicated by an (a).

For controlling the cooling power compressor 60 will be switched on and off by controller 90, wherein compressor 60 if switched on will run at minimum speed level (a) and after evaporator 30 has provided sufficient cooling power to supply air stream 23 compressor 60 will be switched off.

Even though compressor 60 is switched on and off after certain time intervals the precision of the temperature control within cargo volume 16 is still high due to the sufficiently high thermal inertia of the entire system and due to the low cooling power required.

Closed cooling circuit 70 can further be operated at operational stage 2 which extends between level (A) of the cooling power and level (B).

In this stage closed cooling circuit 70 is still operated with the first compressor speed related cooling capacity which is identical to the compressor speed related cooling capacity in operational stage 1.

However, in operational stage 2 compressor 60 is running uninterruptedly and the cooling power provided at evaporator 30 will be controlled by controlling the speed of compressor 60.

A transition between operational stage 1 and operational stage 2 can be easily achieved by terminating the temporary interruptions in operation of compressor 60 and keeping compressor 60 continuously running so that due to the first compressor speed related cooling capacity cooling power according to level (A) is provided at evaporator 30. If a higher cooling power is required at evaporator 30 the speed of compressor 60 can be altered until value (b) which corresponds to level (B) of the cooling power when operating closed cooling circuit 70 with the first compressor speed related cooling capacity.

Controller 90 is further adapted to operate closed cooling circuit 70 in operational stage 3 as indicated in FIG. 5.

Operational stage 3 extends from a cooling power corresponding to level (H) to a cooling power corresponding to level (C).

In stage 3 compressor 60 is operated in its second mode in which its first stage 130 and its second stage 132 are operable so that compressor 60 operates as a two stage compressor. In operational stage 3 economizer 77 is still inoperable.

Due to the fact that compressor 60 is now operating in its second mode, e.g. as a two stage compressor, the compressor speed related cooling capacity of closed cooling circuit 70 is higher than when compressor 60 is only operated with its first mode so that in operational stage 3 closed cooling circuit 70 is operated with a second compressor speed related cooling capacity.

For controlling the cooling power provided at evaporator 30 controller 90 controls the speed of compressor 60 between its minimum speed which corresponds to level (g) to the maximum possible speed in operational stage 3 which corresponds to level (d).

A transition between operational stage 2 and operational stage 3 can be carried out only with a certain hysteresis for avoiding rapid switching back and forth of controller 90 between operational stage 2 and operational stage 3.

To obtain such a hysteresis, closed cooling circuit 70 will be operated in operational stage 2 until level (B) of the cooling power and when level (B) is achieved compressor 60 will be switched from its first mode to its second mode and consequently closed cooling circuit 70 will be operated with the second compressor speed related cooling capacity so that the speed of compressor 60 has to be reduced from level (b) to level (c) if only cooling power of level (B) is demanded.

If, however, closed cooling circuit is operated in operational stage 3 and cooling power of level (B) is demanded at evaporator 30 closed cooling circuit 70 will remain at operational stage 3. Even if the demanded cooling power is reduced closed cooling circuit 70 will remain in operational stage 3 until a level (H) of the cooling power which is below level (B).

If the demanded cooling power is lowered to level (H) compressor 60 will be switched from its second mode used in operational stage 3 to its first mode used in operational stage 2. Since the first compressor speed related cooling capacity is lower than the second compressor speed related cooling capacity the speed level of compressor 60 which is (a) at level (H) of the cooling power has to be increased up to level (h).

Controller 90 can further operate closed cooling circuit 70 in operational stage 4. In operational stage 4 compressor 60 is operated in its second mode, e.g. as a two stage compressor, and further in operational stage 4 economizer 77 is operable.

Due to the fact that economizer 77 is able to further increase the compressor speed related cooling capacity of closed cooling circuit 70 in operational stage 4, closed cooling circuit 70 will have a third compressor speed related cooling capacity which is the highest available compressor speed related cooling capacity.

A transition between operational stage 3 and operational stage 4 is also possible with some kind of hysteresis.

If cooling circuit 70 is operated in operational stage 3 and has the second compressor speed related cooling capacity the maximum possible cooling power is defined by level (C) and obtained at a speed level (d). At this point controller 90 switches on evaporator 77 by actuating solenoid valve 120 to open pipe 106.

After opening of solenoid valve 120 a so-called "economizer fade in" takes place, which means that economizer 77 starts to affect the compressor speed related cooling capacity and the "economizer fade in" is terminated if economizer 77 is fully operable. During this "economizer fade in" controller 90 will adapt the speed of compressor 60 in response to the cooling power provided at evaporator 30 and in response to cooling power demanded. If, for example, a cooling power at a level corresponding to level (C) is required, controller 90 will reduce the speed of compressor 60 according to the increasing effect of economizer 77 on the compressor speed related cooling capacity.

If, however, during "economizer fade in" the cooling power demanded at evaporator 30 is between level (C) and level (D) controller 90 will reduce the speed of compressor 60 to a lesser extent so that at the end of the "economizer fade in" closed cooling circuit 70 will provide the respective cooling power.

If during "economizer fade in" the cooling power demanded at evaporator 30 reaches level (D) the speed of compressor 60 will not increase but due to the increasing effect of economizer 77 on the compressor speed related cooling capacity level (D) of the cooling power will be achieved after a certain interval of time at a compressor speed at level (d) which corresponds to the cooling power at level (C) in operational stage 3.

If closed cooling circuit 70 is in operational stage 4 and the cooling power demanded at evaporator 30 decreases closed cooling circuit 70 is maintained in stage 4 even if the level of cooling power decreases below level (C) as long as a level (F) is reached which is below level (C).

After level F of the cooling power has been reached economizer 77 will be switched off so that a so-called "economizer fade out" takes place due to the fact that economizer 77 does not suddenly affect the compressor speed related cooling capacity.

Consequently, controller 90 will adjust the speed of compressor 60 in response to the change in the compressor speed related cooling capacity due to the "economizer fade out" until the second compressor related cooling capacity is reached so that closed cooling circuit 70 has returned to operational stage 3.

If the demanded cooling power corresponds approximately to level (F) controller 90 will increase the speed of compressor 60 in accordance with the degree of "economizer fade out".

If, however, during the "economizer fade out" the demanded cooling power decreases to level (G) controller 90 will maintain the speed at level (f) so that the cooling power of closed cooling circuit decreases in accordance with the "economizer fade out".

In operational stage 4 closed cooling circuit 70 can be operated between level (F) up to the highest possible cooling power which corresponds to level (E).

As an example for the purpose of illustration a start-up of a transportable cooling unit according to the present invention will be performed by controller 90 as follows:

As shown in FIG. 5 if the cooling unit is switched on compressor 60 starts running at minimum speed as indicated at level (a) in FIG. 5. In addition, evaporator fans 20 start running.

If the cooling power demanded at evaporator 30 is in the region between zero and level (A) the cooling unit is operated in operational stage 1 in which compressor 60 runs at minimum speed at level (a) and will be interrupted after the desired temperature level at evaporator 30 is obtained. Even though compressor 60 is switched off temporarily the precision of the temperature control within cargo volume 16 is still high because the entire system has a sufficient inertia due to the low cooling capacity required.

If the cooling power required at evaporator 30 exceeds level (A) compressor 60 is operated in operational stage 2 and controller 90 will control the cooling capacity is only by controlling the speed at which compressor 60 is operated.

Closed cooling circuit 70 is maintained within operational stage 2 until a cooling power at level (B) or higher is required. If a cooling power at level B or higher is demanded controller 90 switches closed cooling circuit 70 from operational stage 2 to operational stage 3. In the second mode the cooling capacity of closed cooling circuit 70 is increased and for this reason the speed at which compressor 60 is driven has to be decreased. This enables a higher cooling capacity to be obtained at even lower speed of compressor 60 so that even higher cooling capacity can be obtained if the speed of compressor 60 is increased again. In operational stage 3 of closed cooling circuit 70 the cooling power can be controlled by controlling the speed of compressor 60.

When cooling power level (C) or higher is demanded controller 90 switches closed cooling circuit 70 from operational stage 3 to operational stage 4.

In operational stage 4 controller 90 controls the cooling power by uninterruptedly varying the speed of compressor 60.

The cooling requirement within cargo volume 16 can be detected in various ways.

In a so-called chilled mode, in which the temperature within cargo volume 16 is above $-10°$ Celsius controller 90 is operated in the chilled mode program and in the chilled mode program controller 90 detects the temperature within cargo volume 16 by means of the supply air sensors 96 which detect the temperature within supply air stream 23.

In the chilled mode program the evaporator fans 20 are also operated at maximum speed for obtaining very small deviations from the desired temperature level. These deviations are in the range of $+/-0.25°$ Celsius.

In another case, a so-called frozen mode, the temperature within the cargo volume 16 is below $-10°$ Celsius and in this case controller 90 is in the frozen mode program, in which the temperature within cargo volume 16 is detected by temperature sensor 92 detecting the temperature within return air stream 22 before reaching evaporator 30.

In this case, evaporator fan 20 is operated at a speed below its highest speed, a so-called low speed level because the tolerances from the desired temperature can be higher. In case of the frozen mode the tolerances can be of about $+/-1°$ Celsius.

What is claimed is:

1. Transportable cooling unit for maintaining a transport volume at a defined temperature, comprising a closed cooling circuit serially including a multi-stage compressor, a condenser, an expansion device and an evaporator arranged in said transport volume, a speed controlled electric motor driving said compressor, and a controller sensing a temperature present within said transport volume and controlling said electric motor so as to provide the cooling power demanded at said evaporator for maintaining said defined temperature and minimizing energy consumption, said controller operating said closed cooling circuit between a minimum possible cooling power and a maximum possible cooling power in a sequence of different operational stages comprising a lowest operational stage and a sequence of at least two upper operational stages, said controller operating said closed cooling circuit in each one of said upper operational stages at a compressor speed related cooling capacity different from said compressor speed related cooling capacity in said other upper operational stages, and within said respective upper operational stages said controller operating said electric motor in an uninterrupted mode and adjusting said cooling power provided by said closed cooling circuit by an essentially stepless speed control of said electric motor.

2. Cooling unit according to claim 1, wherein said speed controllable electric motor is a frequency controlled AC-motor.

3. Cooling unit according to claim 1, wherein said controller operates said compressor in said lowest operational stage in an interrupted mode at low speed and adjusts said cooling power by adjusting at least one of the parameters comprising interruption interval and speed.

4. Cooling unit according to claim 3, wherein said controller in said lowest operational stage maintains said speed of said electric motor essentially constant and varies the interruption intervals.

5. Cooling unit according to claim 4, wherein in said lowest operational stage said constant speed of said electric motor is in the dimension of the minimum possible speed of said compressor.

6. Cooling unit according to claim 1, wherein said controller defines the cooling power demanded by comparing the temperature present within said transport volume and the temperature of ambient air.

7. Cooling unit according to claim 1, wherein said controller senses the temperature in a stream of air circulating within said transport volume.

8. Cooling unit according to with claim 7, wherein said controller senses the temperature within said transport volume close to said evaporator.

9. Cooling unit according to claim 1, wherein said controller selects the currently necessary operational stage in accordance with the cooling power demanded and adjusts the speed of the compressor for precise adjustment of the cooling power provided by said closed cooling circuit.

10. Cooling unit according to claim 1, wherein said compressor speed related cooling capacity of said closed cooling circuit is constant within said lowest operational stage.

11. Cooling unit according to claim 1, wherein said compressor speed related cooling capacity of said closed cooling circuit is constant within each of said upper operational stages.

12. Cooling unit according to claim 1, wherein said compressor speed related cooling capacity of said closed cooling circuit is the same as the compressor speed related cooling capacity in said one of said upper operational stages covering the lowest range of cooling power of said sequence of upper operational stages.

13. Cooling unit according to claim 1, wherein controller switches from one upper operational stage to another upper operational stage with a hysteresis with respect to the level of cooling power.

14. Cooling unit according to claim 13, wherein in the course of a transition from one of said upper operational stages to another of said upper operational stages said controller maintains full control of the cooling power provided by said closed cooling circuit by adjusting the speed of said compressor in accordance with the change of the compressor speed related cooling capacity.

15. Cooling unit according to claim 1, wherein said multi-stage compressor is operable in a first mode using a reduced number of stages or in a second mode using all stages.

16. Cooling unit according to claim 15, wherein said multi-stage compressor is controllable by said controller so as to operated in said first mode or in said second mode.

17. Cooling unit according to claim 16, wherein in one of said upper operational stages of said closed cooling circuit said compressor operates in said first mode and in another of said upper operational stages of said closed cooling circuit said compressor operates in said second mode.

18. Cooling unit according to claim 17, wherein said controller switches from an operational stage in which the compressor operates in said first mode to the operational stage in which the compressor operates in said second mode at a defined level of cooling power which is higher than the defined level of cooling power at which the controller switches from the operational stage in which the compressor operates in said second mode to the operational stage in which the compressor operates in said first mode.

19. Cooling unit according to claim 1, wherein an economizer is provided in said closed cooling circuit.

20. Cooling unit according to claim 19, wherein said economizer can be switched by said controller between an economizer on-mode and an economizer off-mode.

21. Cooling unit according to claim 20, wherein in one of said upper operational stages the closed cooling circuit is controlled to operate in an economizer off-mode and in another of said upper operational stages said closed cooling circuit is controlled to operate in an economizer on-mode.

22. Cooling unit according to claim 21, wherein said controller switches from the operational stage in which the closed cooling circuit is in the economizer off-mode to the operational stage in which the closed cooling circuit is in the economizer on-mode at a defined level of cooling power which is higher than the defined level of cooling power at which the controller switches from the operational stage in which the closed cooling circuit is in the economizer on-mode to the operational stage in which the closed cooling circuit is in the economizer off-mode.

23. A refrigerated container comprising:
   a thermally insulated housing enclosing a transport volume to be cooled, and
   a cooling unit, according to claim 1, for cooling air circulating in said transport volume.

* * * * *